United States Patent [19]

Normando et al.

[11] 3,839,619
[45] Oct. 1, 1974

[54] VERTICAL WELDING OF HEAVY ALUMINUM ALLOY PLATES

[75] Inventors: Neil J. Normando, Livingston, N.J.; Dana V. Wilcox, Richmond, Va.

[73] Assignees: Reynolds Metals Company, Richmond, Va. ; by said Wilcox; Airco, Inc., Montvale, N.J. ; by said Normando

[22] Filed: Sept. 11, 1973

[21] Appl. No.: 396,288

[52] U.S. Cl................................... 219/126, 219/73
[51] Int. Cl............................................. B23k 23/00
[58] Field of Search............................. 219/73, 126

[56] References Cited
UNITED STATES PATENTS

| | | | |
|---|---|---|---|
| 3,251,526 | 5/1966 | Agnew et al.................. | 219/126 X |
| 3,296,412 | 1/1967 | Waite et al. ..................... | 219/73 X |
| 3,484,574 | 12/1969 | Santilhano ........................... | 219/73 |
| 3,610,867 | 10/1971 | Bartle .................................. | 219/73 |

Primary Examiner—J. V. Truhe
Assistant Examiner—N. D. Herkamp
Attorney, Agent, or Firm—Larry R. Cassett; H. Hume Mathews; E. W. Bopp

[57] ABSTRACT

A system for welding large aluminum alloy plates in a single vertical pass by the gas metal-arc (GMA) process wherein the technique comprises spacing square butt edges of the plates about three-fourths inch to form the welding gap; oscillating between defined dwell limits a welding electrode across the gap at comparatively high rate to deposit thin layers of weld metal, and confining the weld metal by dams having facing surfaces of molded high-density electrographitic material machined to high finish respectively. The dams together with the welding head are moved vertically upward at a smooth, uniform rate to preclude any objectionable jerking movement of the facing surfaces.

20 Claims, 4 Drawing Figures

VERTICAL WELDING OF HEAVY ALUMINUM ALLOY PLATES

Welding of large steel plates in a single vertical pass has been successfully achieved in heavy industry for some years. In a preferred method, the steel plates are vertically positioned and aligned with adjacent edges squared off and spaced to form a vertical gap. Starting from the foot of the gap, a welding head is oscillated across the gap, generally with gas shielding, for depositing weld metal thereby building up the weldment vertically in a single pass. The weld metal is laterally confined in the gap by opposing watercooled dams, generally of copper, that are moved upwards as the height of the weld increases. This method, primarily because of the economical and time-saving feature of the single pass, is in common use for welding heavy plates of steel alloys.

There has recently developed increased need especially in cryogenic applications, for large aluminum alloy containers. The construction of containers such as land storage tanks and ocean-going ships for storing and transporting liquid natural gas (LNG) for example, requires vertical welding of large aluminum alloy plates. Presently proposed methods for successfully welding aluminum plates involve weld procedures such as the "Double-V" joint for example, wherein a V-notch at each side of the abutting plates is gradually filled with weld metal in a large number of time-consuming vertical passes; moreover, the rate of weld metal deposition is comparatively low, such as 3 to 5 lb. per hour. Thus, multiple-pass methods of welding aluminum plate not only consume considerable production time but are expensive in labor costs, etc.

Efforts to use a single-pass method for welding aluminum such as described for steel welding have heretofore been unsuccessful. Many tests involving different dam configurations and materials, cooling methods, rates of weld metal deposition, etc. have been made over a period of years without success in producing by single-pass methods satisfactory sound welds capable of meeting standard industry specifications. For example, the materials tried out in the dams were generally abrasion-resistant and included hard-coated aluminum, graphite block, alumina plate, and various hard oxide coatings such as $Al_2O_3$ and $Zr_2O_3$ sprayed on standard copper dams. In no instance did the weld-facing surfaces of the dams resist deterioration long enough to establish satisfactory process procedures and acceptable weldment mechanical and metallurgical properties.

A main cause of weld failure in these single-pass tests was so-called "tearing" and gouging of the weld bead surface by the dam as it progressed upwards with the weldment. The tearing and, in many cases, gouges, were found to cause cracks extending from the bead surface into the weldment, thus impairing the quality of the weld. This has been likened to the situation wherein moist earth under compression is scraped with a shaver or bulldozer blade, with resulting deep cracks. In the attempts mentioned above to weld aluminum alloy plates, faulty welds were frequent and showed under examination that the cracks had the characteristics of hot tears and tended to follow the solidification pattern.

The present invention is concerned therefore with an improved technique and apparatus for successfully welding heavy aluminum alloy plate by single-pass equipment of the general character described above, that is efficient, economical and time-saving.

SUMMARY OF THE INVENTION

In accordance with the invention, a vertical welding gap approximately three-fourths in. wide is formed between square butt edges of vertically positioned and aligned aluminum alloy plates. A continuously fed welding electrode having inert gas shielding is oscillated at a comparatively high uniform rate across the gap to deposit layers of weld metal of limited thickness in the gap at a rate of at least 10 lb. per hour, starting from the foot to complete the weldment in a single vertical pass. In this gas metal-arc (GMA) technique, the electrode travel is restricted to predetermined position limits within the gap itself and includes a critical time range dwell at the opposite limits of travel. The molten weld metal is laterally confined in the gap by opposing watercooled dams that are vertically raised at a comparatively smooth, uniform rate for avoiding any significant jerking or hesitant movement at the weld metal contacting surfaces. Motive means are connected to the welding head for moving it and the dams to correspond with the increase in height of the weldment. The weld-facing surfaces of the dams are composed of high-density molded electrographitic material machined to a high finish, wherein the grain sizes are generally less than 175 microns.

A principal object of the invention is to provide improved single-pass GMA vertical welding technique and apparatus capable of consistently producing sound weldments of heavy aluminum plate at a welding rate of at least 10 lb. per hour.

Another and related object is to provide improved singlepass vertical welding technique and apparatus of the character described above wherein tearing and gouging of the weld bead at the contacting dam surfaces is substantially eliminated, and sound welds of aluminum alloy plate are consistently made at a welding rate of at least 10 lb. per hour that are similar in quality to those made by the GMA multipass process.

Other objects, features, and advantages will appear from the following description with reference to the accompanying drawings.

PREFERRED EMBODIMENT OF INVENTION

Figure 1:
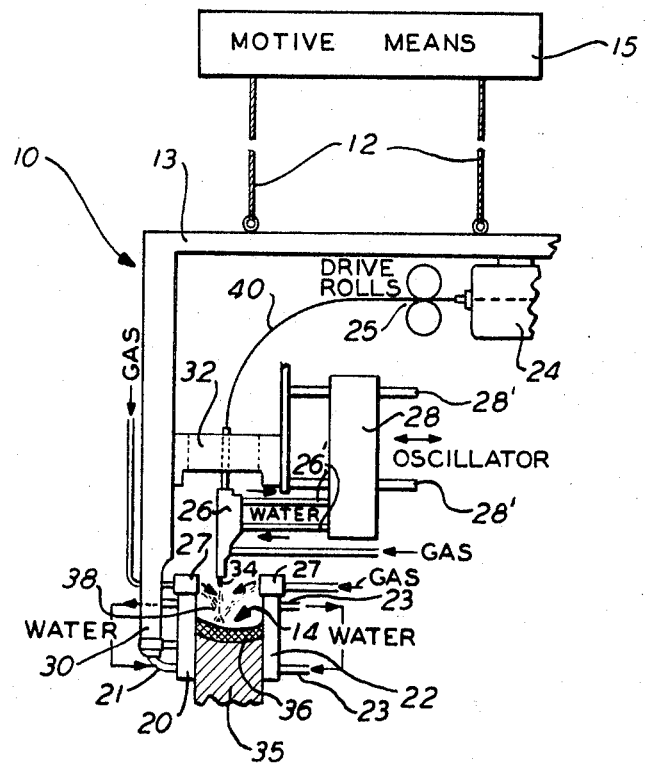
FIG. 1 is a general view in elevation of GMA type vertical welding equipment used in practicing the present invention.

FIG. 1 shows by way of example vertical welding equipment according to the present invention for single-pass welding of large aluminum alloy plates. The equipment comprises essentially an integrated assembly forming a welding head 10 that is bodily suspended as by cables 12 for vertical movement along the spaced edges of the plates to be welded. The cables 12 connect the head assembly frame 13 to a motive means 15 which is energized to raise or lower the head as required with respect to the plates. The plates themselves are not shown in FIG. 1 as the section taken is at the gap 14 between the plate edges.

Figure 2:
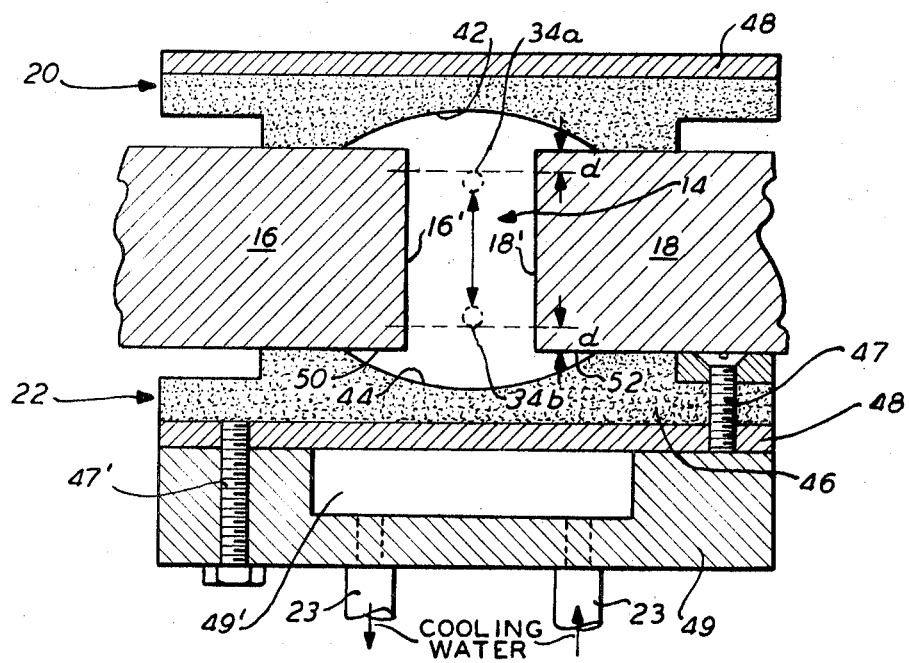
FIG. 2 is a simplified plan view of the welding gap and dams from above, with illustration of electrode travel within the gap.

As shown in more detail in FIG. 2, viewing the welding gap 14 from above, the aluminum alloy plates at 16 and 18 are vertically fixed and aligned with their square butt edges, spaced approximately three-fourths inch to form the separation or welding gap 14. At the lateral sides of the gap, weld metal retaining dams 20 and 22 are positioned to bridge the plates and move with the head along the sides of the plates opposite the weldment as it is formed. The dam 22 is also movable laterally away from the plates upon completion of the weld.

The welding head assembly includes a supply roll of welding electrode wire (not shown) that is automatically fed through a wire straightening device 24 and drive rolls 25 to a feed guide 26 that is in turn connected to an oscillating mechanism 28 mounted on the head. The dams 20 and 22 are connected to the head frame 13 by vertical supporting structure 30; accordingly as the head is raised by the cables 12 the dams move uniformly with the head and electrode feed guide 26 in fixed spaced relation thereto.

The welding head is in general similar to that commonly used for steel vertical welding and therefore need not be described in detail. Briefly, the dams 20 and 22 are of the water-cooled type as indicated by the flow connections at 21 and 23 respectively, and the arc is shielded by inert gas. The shielding gas is fed into the arc gap through the wire guide 26 concentrically of the wire, and also from gas boxes at the tops of the dams at 27 as indicated by the flow direction arrows. The wire guide which is subject to the heat of the arc, is also water-cooled by suitable flow connections 26. The oscillator 28 is generally indicated as supported and guided for lateral reciprocal movement on guide rods 28' which form an integral part of the head frame member 32. The oscillator includes motive means for controlling the lateral movement of the electrode guide 26 with respect to the welding gap as presently described.

The vertical welding equipment of FIG. 1 as described above, ordinarily is controlled (for steel welding) in known manner according to change in the magnitude of the arc voltage due to change in distance from the electrode contact tip 34 to the weld metal puddle 36 as the elctrode is melted by the arc 38. The rate of welding, i.e. deposition of weld metal, is set by feeding the welding wire 40 through the electrode guide 26 at a predetermined constant rate. In the arc voltage type control, the motive means 15 for raising the welding head and dams is energized to compensate for the change in arc voltage as the weldment 35 and puddle continue to build up in the gap 14. Accordingly, the dams tend to be raised by incremental steps that depend in magnitude on the sensitivity of the arc voltage control.

This factor is tolerated without difficulty in welding steel plates due to the well-defined voltage changes in arc length where steel is involved, i.e. the arc voltage change for a given unit change of arc length is sufficiently large to ensure sensitive control for moving the dams in comparatively small steps that tend to approximate uniform motion.

However, the characteristics of aluminum are such that the arc voltage change per length unit is reduced by a factor of 8 as compared with steel, thereby tending to reduce control sensitivity accordingly. The ordinary result (in the absence of complicated and expensive amplification equipment for increasing control sensitivity) would be comparatively large incremental steps in the dam movement approaching jerking with objectionable pauses in between. Due to the comparatively high freezing rate of aluminum and other factos, such erratic movement of the dams tends to cause sticking between the dam facing surfaces and the weld metal, thereby tearing and gouging the weldment upon resumption of dam movement.

For avoiding the harmful effects of non-uniform dam movement under low sensitivity arc voltage control as described above, the motive means connected to the head preferably is set to operate at a predetermined uniformly constant rate, thereby producing smooth and even movement of the dams. This rate is empirically determined for a given wire feed and can be closely set. The movement of the welding head is readily adjusted if the puddle level is observed as too high or too low in the gap 14. This factor taken by itself however, is not necessarily responsible for all weld failures due to bead tearing and gouging. The characteristics of the aluminum alloy plate and welding metal when heated and molten are sufficiently different and complex that steel welding techniques are of little value in welding aluminum plate. For example, the rapid cooling rate of aluminum and the "wetting quality" of aluminum melt with respect to many materials cause difficulty in achieving a smooth weld bead surface as the aluminum solidifies, even during continuous relative motion between the dam facing surfaces and solidifying aluminum. There also appear to be other metallurgical factors involved in bead tearing not presently fully understood. It has been found however, that sound welds of heavy aluminum alloy plates such as plates of 1 to 2 inches in thickness, can be predictably and consistently made at welding rates exceeding 10 pounds per hour, following the techniques of this invention.

Referring now to FIG. 2, the travel limits of the welding electrode 34 within the gap 14 as it is moved back and forth by the oscillator 28, are represented at positions 34a and 34b respectively. It will be noted that these positions are within the gap by a definite distance $d$ which preferably is about one-fourth to three-eighths inches for the ¾ inch welding gap in question. For the welding rates used, i.e. at least about 10 pounds per hour, this distance determined empirically is found suitable for achieving certain desirable objectives including (a) uniform layering of weld deposit due to better heat distribution throughout the weld gap, (b) good fusion at the edges of the aluminum plates and (c) prevention of excessive heating of the dam facing surfaces; it is also sufficient to form the weld beads in the dam grooves 42 and 44 without "roll over" of weld metal along the sides of the plates at opposite edges of the grooves.

Figure 4:
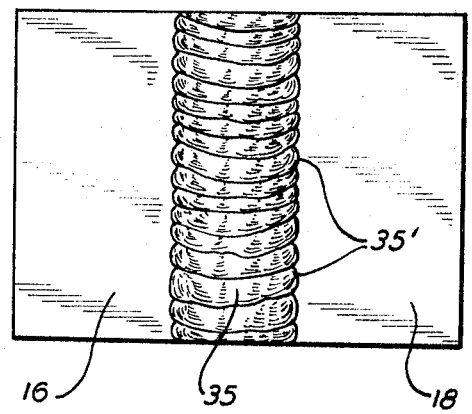
FIG. 4 is an illustration of an aluminum alloy plate and weldment made according to the invention.

For movement of the electrode between the limit positions described, the oscillator 28 is programmed for practically constant speed of the electrode between the defined limits, preferably at a rate of at least 18 inches per minute. This rate has been found satisfactory for consistently making sound welds at welding rates of about 10.9 pounds per hour, for example. A sound weld of this character made according to the invention is shown in FIG. 4. The weld metal 35 forming the "bead" at the edges of the aluminum plates 16 and 18 is as indicated, made up of layers 35' as described above. The bead at its edges has good fusion with the plates along the entire length of the weldment.

At each travel limit the electrode pauses for a dwell of from one-half to 3 seconds, preferably about 1 second, primarily for insuring cycle time for proper fusion at the plate edges. The total cycle time for electrode travel equals twice the travel time required for one traverse, plus the total dwell time (1 to 6 seconds) at the fixed and movable dams, respectively.

In general, the deposition of weld metal is made at oscillation rates corresponding to at least 4 complete cyles per minute.

As the dwell time is also an important factor in gap heat distribution, weld fusion, etc., it is necessarily closely related to the limit positions of electrode travel within the gap. For example if the dwell time at one side of the gap is excessive the adjacent dam face may overheat and the melt at the opposite side may start prematurely to solidify; and conversely, if the dwell time is insufficient, proper fusion at the plate edges and along the bead may not be achieved. Accordingly, the two dwell times and the electrode limit positions may be independently adjusted and coordinated to compensate for variation in observed conditions at the respective dams.

Figure 3:
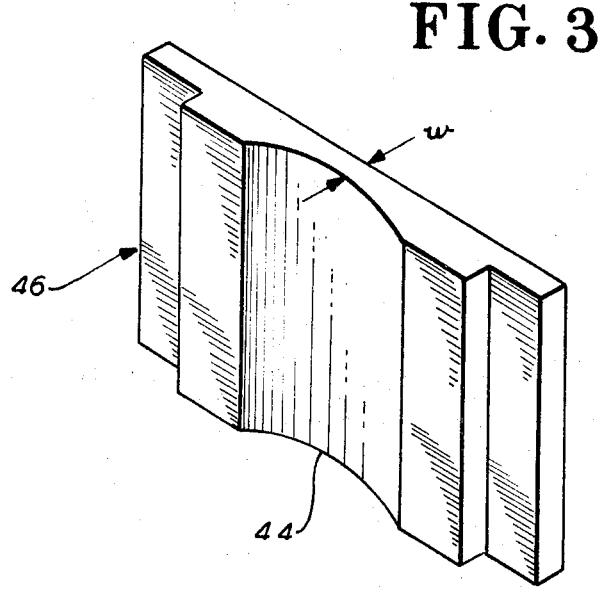
FIG. 3 is a view in perspective of a molded graphite dam shoe as used in the invention.

The configuration and composition of the dams are factors of critical importance in practicing the invention. As mentioned above, numerous materials have been used heretofore in unsuccessful attempts using a fluxless, continuous wire process to weld heavy aluminum plate. The structural features of the dams are indicated in FIGS. 2 and 3 wherein each dam, taking the movable dam 22 for example, comprises in the present instance a shoe 46 of high density molded electrographitic material with a backing plate 48 of heat conducting material such as copper. The graphite shoe is of unusually high density, ranging from an apparent density of approximately 1.60 to 1.90 gm/cc, the particles thereof having a maximum size of approximately 175 microns. A preferred particle size is about 20 microns which is the smallest size readily available commercially. The electrographitic material used herein is preferably produced by molding, either by hydraulic press or isostatic molding methods, rather than by extrusion as the present extruded product appears to be less suitable for meeting all mechanical characteristics required of the graphite dam. As given herein, the particle size of the graphite refers to the carbon particle size before it is processed in the electric furnace and molded.

The graphite shoe shown as such in FIG. 3, is machined from a block with a central groove 44 generally of arcuate contour for the weld bead, and is machined to a high finish. A preferred graphite shoe that produced a smooth bead contour and sound weld of high quality had a particle size of 20 microns. Each graphite shoe bead groove is approximately 1 ¼ to 1 ½ inches in width and about 3/16 inch deep, and extends beyond the weld gap at 50 and 52 by about one-fourth inch, FIG. 2, so as to insure good wetting of the plates by the weld metal at the bead edges. The wall thickness W of the graphite shoe at the bottom of the groove, FIG. 3, is about one-eighth to three-sixteenths inch and is preferably about one-eighth inch for good thermal characteristics.

The copper backing plate 48 for each shoe, FIG. 2, is water-cooled in known manner by heat transfer passages and serves to conduct excess heat from both the graphite shoes and the weld zone; it also serves to provide adequate mechanical strength for the graphite shoe to seal the water cooling chamber of the dam. Since both dams are similar a description of the arrangement for the dam 22 will be sufficient. The copper plate 48 and graphite shoe 46 are suitably secured together to provide good thermal conduction, as by bolting at 47. The dam structure is completed by a brass block 49 that is also connected as by bolting at 47' to the plate 48, and has a recess 49' that forms with the plate 48 a cooling chamber. The chamber is connected as indicated to the cooling water lines 23 shown also in FIG. 1, for carrying heat from the dam.

In practicing the invention for welding 5083 Al alloy plate at the rate of approximately 10.9 to 12 pounds per hour and using both one-sixteenth and 3/32 inch diameter welding wires for a square butt joint with ¾ inch gap separation, the welding current in general was held to less than 500 amps; for ensuring adequate electric power generation in the arc, a gas shielding mixture of 75 percent helium and 25 percent argon was used.

By way of example, welding data are given below for representative sound weldments that were made in aluminum alloy 5083-O according to the invention.

| WELDING DATA | EXAMPLE I | EXAMPLE II | EXAMPLE III | EXAMPLE IV |
|---|---|---|---|---|
| Plate Thickness | 1¾ inches | 1¾ inches | 2 inches | 1 11/16 inches |
| Weld Wire Electrode | 3/32 in. dia. | 1/16 in. dia. | 1/16 in. dia. | 3/32 in. dia. |
|  | 5183 Al. Alloy | 5356 Al. Alloy | 5183 Al. Alloy | 5183 Al. Alloy |
| Arc Current | 420 – 450 amp. | 380 amp. | 380 – 400 amp. | 370 – 400 amps. |
| Arc Voltage | 29 – 29.5 volts | 28 – 28.5 volts | 29.5 – 30 volts | 29 – 30 volts |
| Wire Feed Rate | 300 ipm | 600 ipm | 600 ipm | 300 ipm |
| Wire Deposition Rate | 12 lbs/hr | 10.9 lbs/hr | 10.9 lbs/hr. | 12 lbs/hr. |
| Contact-Tip Work Distance | 1½– 1 inches | 1½ inches | 1½ inches | 1½ inches |
| Gas Flow Rate (Est.) | 250 scfh | 300 scfh | 250 scfh | 250 scfh |
| Dam Shoe Material | Airco Speer 9326 | National Carbon ATJ Grade | National Carbon ATJ | Airco Speer 9326 |
| Dam Shoe Dimensions: |  |  |  |  |
| Groove Width | 1½ inches | 1 3/8 inches | 1½ inches | 1½ inches |
| Groove Depth | 3/16 inch | 3/16 inch | 3/16 inch | 3/16 inch |
| Thickness (W) | ⅛ inch | 3/16 inch | ⅛ inch | ⅛ inch |
| Oscillator Cycles Per Min. | 11 | 5 | 4.5 | 10 |

| WELDING DATA | EXAMPLE I | EXAMPLE II | EXAMPLE III | EXAMPLE IV |
|---|---|---|---|---|
| Electrode Dwell Position (d) | ¼ inch | 5/16 inch | ¼ in. Fixed dam 5/16 in. Movable dam | ⅜ inch |
| Dwell Time Fixed Dam Movable Dam | 1.2 seconds 1.1 seconds | 1.9 sec. 1.7 sec. | 1.9 sec. 1.7 sec. | 1.2 sec. 1.4 sec. |

In all the examples given above, the graphite dam shoe was made of electrographitic molded material as identified commercially, and had a 3/16 inch copper back-up plate for conducting heat from the shoe, etc., as previously described.

In these and other representative tests, sound welds up to four foot in length of aluminum alloy plates 1 to 2 inches thick, of 5083-0 alloy were made using 5356, 5556 and 5183 electrodes with acceptable weld bead surfaces and good fusion. The weld beads were comparatively smooth with no "roll-over" at the edges, FIG. 4 which is representative indicating good fusion at the joint edges and an acceptable weld surface. The latter factor may be due in part to the melting point of aluminum (about 660°C) being below the wetting point, (about 800°C) at which aluminum wets the graphite. In all these successful tests, high density molded electrographitic dam shoes were used in combination with comparatively high speed programmmed electrode oscillation for weld metal deposit control, and uniform dam movement control, all as described herein.

Examination and testing of the completed welds showed that the room temperature tensile strength, bend ductility and toughness thereof were similar to those obtained using the GMA multipass process; this was especially true for the 5183 welds. Radiographs taken of the full thickness welds showed all welds to be sound, with no lack of fusion and little or no visible porosity. It was also found by weld analysis that there was insignificant magnesium loss in the puddle occasioned by the relatively high heat input incident to electrogas welding.

Having set forth the invention in what is considered to be the best embodiment thereof, it will be understood that changes may be made in the system and apparatus as above set forth without departing from the spirit of the invention or exceeding the scope thereof as defined in the following claims.

We claim:

1. The method of vertically welding heavy aluminum alloy plates by the GMA welding process in a single vertical pass which comprises:
   a. aligning and spacing the butt edges of the plates to form a narrow welding gap of substantially uniform width,
   b. oscillating a GMA welding head across the gap to achieve a relatively uniform and thin deposit of weld metal for each complete oscillation cycle,
   c. depositing filler weld metal therein at a rate of at least 10 pounds per hour,
   d. confining the gap laterally with dam faces composed of high density molded electrographitic material, and
   e. moving the dam faces vertically at a substantially uniform rate to conform with building of the weldment.

2. The method as specified in claim 1 wherein the density of the graphite dam faces is at least 1.60 gm/cc.

3. The method as specified in claim 1 wherein the dam faces are of high-density molded electrographitic material having a grain size that does not exceed approximately 175 microns.

4. The method as specified in claim 1 wherein the uniform rate of dam movement is preset according to the rate of weld metal deposition.

5. The method as specified in claim 1 wherein the oscillation of the welding head is briefly interrupted at each end of the traverse for a dwell of from one-half to 3 seconds prior to reversal of movement.

6. The method as specified in claim 5 wherein the width of the welding gap is approximately three-fourths inch and the dwell positions of the electrode are within the gap about one-fourth to three-eights inch from the vertical planes respectively, that define opposite sides of the aluminum plates.

7. the method as specified in claim 6 wherein the dwell positions are independently adjustable with respect to the vertical planes.

8. The method as specified in claim 1 wherein the weld metal is deposited at oscillation rates corresponding to at least 4 complete cycles per minute.

9. The method as specified in claim 1 wherein the rate of traverse of the welding head across the gap is at least 18 inches per minute.

10. The method as specified in claim 1 wherein weld bead grooves of generally arcuate shape are formed respectively, in the graphite dam faces approximately 3/16ths. inch deep and 1½ inch wide.

11. The method as specified in claim 10 wherein the wall thickness of the graphite at the bottom of the groove is from about one-eighth to 3/16 inches.

12. In an apparatus for welding heavy aluminum plates in a single vertical pass wherein the weld metal is deposited from a GMA welding head between squared butt edges of the plates and movable dams which confine and cool the weld metal, wherein the improvement comprises oscillating means for moving said welding head back and forth between said dams at a velocity of at least 18 inches per minute, and wherein the dams have surfaces which bear on the aluminum plate and weld metal which are high-density graphite having a maximum particle size of approximately 175 microns, and which graphite surfaces have substantially arc shaped grooves therein which are approximately 1 ⅜ – 1½ inches wide and 3/16 inch deep.

13. Equipment for welding heavy aluminum plates in a single vertical pass comprising:
   a. a GMA welding head for depositing weld metal within a gap between butt edges of the plates,
   b. motive means for causing oscillating movement of the welding electrode across the welding gap to respective limit positions within the gap, and for briefly interrupting the electrode movement for definite periods of said limits,
   c. vertically movable dams for laterally confining the weld metal in the gap, the dams having shoes with gap-facing surfaces of high finish for low coefficient of friction with the weld metal and composed of highdensity molded graphite having a particle size of less than 175 microns, and
d. motive means for moving the dams vertically at a substantially uniform and even rate.

14. Welding equipment as specified in claim 13 wherein the high-density graphite is a molded electrographitic material having a maximum grain size of 175 microns.

15. Welding equipment as specified in claim 13 wherein the density of the graphite dams is at least approximately 1.60 gm/cc.

16. Welding equipment as specified in claim 13 wherein the graphite particle size is about 20 microns and the graphite density is about 1.90 gm/cc.

17. Welding equipment as specified in claim 13 wherein the gap is approximately three-fourths inch in width and the graphite weld-facing surfaces have weld bead grooves respectively that are approximately 1½ inch wide for spanning the gap, and approximately 3/16ths inch deep.

18. Welding equipment as specified in claim 17 wherein the graphite wall thickness at the bottom of the groove is approximately one-eighth to 3/16th inches.

19. Welding equipment as specified in claim 13 wherein the dams are moved vertically by a constant speed motor.

20. Welding equipment as specified in claim 13 wherein each graphite shoe has a water-cooled copper backing plate for transferring heat from the graphite facing, the shoe being reinforced by the plate to make a tight seal for the cooling passages.

* * * * *

UNITED STATES PATENT OFFICE
CERTIFICATE OF CORRECTION

Patent No. 3,839,619          Dated    October 1, 1974

Inventor(s) Neil J. Normando and Dana V. Wilcox

It is certified that error appears in the above-identified patent and that said Letters Patent are hereby corrected as shown below:

After the title and before the first paragraph the following should be inserted: --Background of the Invention--

Column 3, line 37 "26" should be --26'--

Column 4, line 10, "factos' should be --factors--

Column 4, line 48, "d" should be --$\underline{d}$--

Column 5, line 28, "variation" should be --variations--

Column 6, line 17, "W" should be --$\underline{W}$--

In the Table below Columns 5 and 6, under EXAMPLE 1" the eighth line of printing "1 1/2 - 1 inches" should be -- 1 1/2 - 1 3/4 inches--

Signed and sealed this 21st day of January 1975.

(SEAL)
Attest:

McCOY M. GIBSON JR.
Attesting Officer

C. MARSHALL DANN
Commissioner of Patents